(12) United States Patent
Hiles

(10) Patent No.: US 6,360,326 B1
(45) Date of Patent: Mar. 19, 2002

(54) PASSWORD DELAY

(75) Inventor: Paul Hiles, Tomball, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/150,164

(22) Filed: Sep. 9, 1998

(51) Int. Cl.[7] .............................. H04L 9/32; G06F 1/32
(52) U.S. Cl. ........................................ 713/202; 713/323
(58) Field of Search ................................. 713/200, 201, 713/202, 300, 323, 324, 1, 2, 320; 710/15, 18, 17

(56) References Cited

U.S. PATENT DOCUMENTS 5,555,373 A * 9/1996 Dayan et al. ............... 713/202
5,875,345 A * 2/1999 Naito et al. ................. 713/202
6,121,962 A * 9/2000 Hwang ....................... 713/202

* cited by examiner

Primary Examiner—Gail Hayes
Assistant Examiner—Christopher Revak
(74) Attorney, Agent, or Firm—Conley, Rose & Tayon, P.C.

(57) ABSTRACT

An innovative security system in which the need to "unlock" the system is eliminated if the system is awakened within a predetermined duration from its last use. In the preferred embodiment, when the user "logs onto" a system by activating it and entering his password, the time of login, plus a predetermined delay, is stored in nonvolatile memory. Thereafter, if the system is placed (or places itself) into a low-power mode, no password will be required to log onto the system if the logon is made before the time stored in nonvolatile memory. If the logon is attempted after this time, the user must go through the entire authorization procedure.

10 Claims, 1 Drawing Sheet

PASSWORD DELAY

BACKGROUND AND SUMMARY OF THE INVENTION

This application relates to computer system security, and in particular to password protection systems in handheld computer systems.

Background: Handheld Computer Systems

As computer technology advances, computer systems are becoming at the same time both smaller and more powerful. Far from traditional calculators or simple address books, today's handheld computers often incorporate full scale word processing, spreadsheet, and database systems. These systems typically include modified versions of the same operating systems found in portable or desktop computer systems, and are able to load and execute any number of different software applications. In addition, many companies use specialized handheld computers for everything from technical support database management to on-the-road communications, and everything in between. In short, it is becoming possible, and even common, for handheld computers to be used for all functions for which traditional desktop or portable systems had been used, but with the natural advantage of greatly increased portability and convenience.

Background: Security in Portable and Handheld Systems

One trade-off for the convenience of handheld and portable computer systems is that the systems are naturally more vulnerable to both theft and compromised data security. Many systems have been proposed for increasing the physical security of these systems, another issue is that of securing the system from unauthorized use, both in case of theft, or in case the system has simply been left unattended for a short time.

In response, many (or even most) portable and handheld computer systems now include some form of password security system. Typically, and at the very least, these systems include the option to require a password to be entered either when the system is first started, or when a user first logs on to the system. Both of these approaches have the disadvantage of leaving the system completely unprotected once the password has been entered for the first time.

Additionally, many systems now include password security systems that activate when the system enters a low-power suspend mode or when a screen saver is activated. These systems are naturally more secure, since when they are left unattended for any length of time, the password system will be activated, and the user must enter a password before the system can be used.

This approach has a significant disadvantage, however. If the system is used in an environment where it is used intermittently and set aside in the mean time, the system will tend to lock itself every time it is not being actively used. While this does in fact increase security, it will slow down the user by requiring him to enter a password every time he needs to use the system. Because of this, the user is much more likely to simply deactivate the password security system rather than have to enter a password each time. Therefore, conventional systems generally force the user to make a difficult choice between convenience and security.

Innovative Computer Security System

This application discloses an innovative security system in which the need to "unlock" the system is eliminated if the system is awakened within a predetermined duration from its last use. In the preferred embodiment, when the user "logs onto" a system by activating it and entering his password, the time of login, plus a predetermined delay, is stored in nonvolatile memory. Thereafter, if the system is placed (or places itself) into a low-power mode, no password will be required to log onto the system if the logon is made before the time stored in nonvolatile memory. If the logon is attempted after this time, the user must go through the entire authorization procedure.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
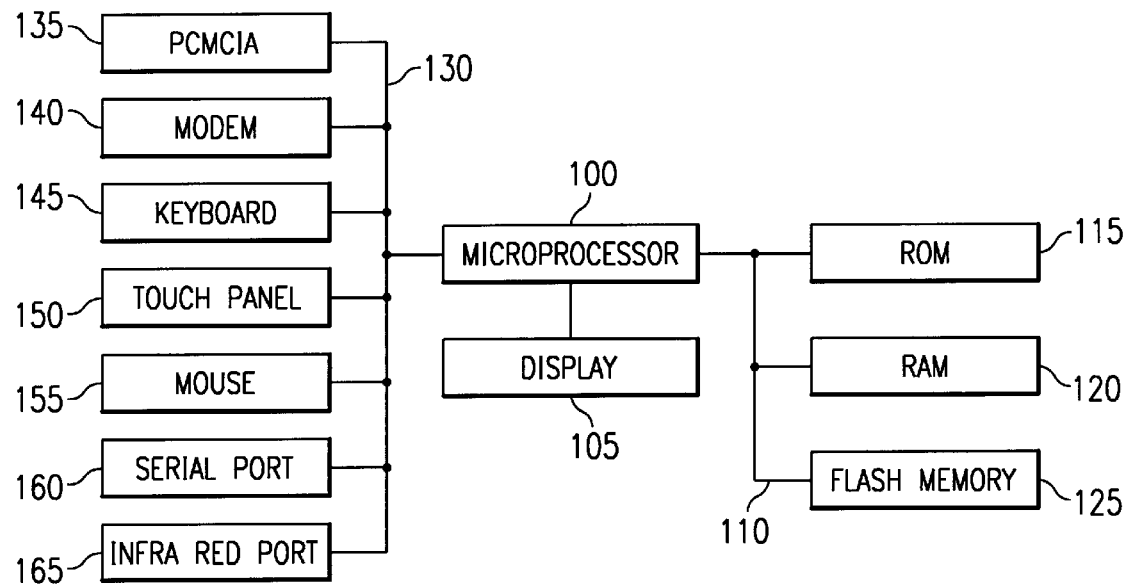
FIG. 1 shows a block diagram of a handheld computer system according to the presently preferred embodiment.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The preferred embodiment comprises a configurable delay integrated with a computer system's password security system. A programmable delay figure is added to the current time and stored whenever a user enters a password. If the system is subsequently shut down and then restarted within the specified delay period, no new password must be entered. In effect, the programmable delay allows the user to specify a period, after a password has been entered, in which the password security feature is temporarily disabled.

In the preferred embodiment, the user is able to select from a number of delay length choices. These include 15 min., 30 min., 1 hr., 2 hr., 4 hr., and OFF. Of course, it is possible to allow the user to select any delay period at all, and remain within the spirit of the invention.

In practice, according to the preferred embodiment, the following actions are taken:

A. The user configures the system, as described below, to his chosen delay time.

B. The next time the user logs into the system, using a password, the delay time is added to the current system time and the resulting time is stored in non-volatile memory.

C. Each subsequent time the user attempts to log into the system, provided that the password delay feature is enabled, the security system checks the system time against the saved time, and if that time period has not expired, it bypasses the security password screen.

D. Once the time period has expired, the login security screen is re-enabled and the user must enter the correct password to gain access to the device.

In the preferred embodiment, in order to configure the delay time, a Password Control applet is provided in the operating system's "control panel" application. In this applet the configured password delay time is set using a drop-down list box control, where the user can select one of the standard options. In this embodiment, the available choices are OFF, 15 minutes, 30 minutes, 1 hour, 2 hours, or 4 hours. If the user selects "OFF" then the password delay feature is disabled. Of course, the choices described here are merely exemplary, and this innovative feature works well with any delay time the user might choose.

The user may be required to log into the system, as in step C. above, by a number of different factors. For example, if the system places itself into a reduced-power or suspend mode, either manually or after a specific duration from last use, the user may be required to log back into the system to resume using it. Alternatively, the system may simply activate a "screen saver" when it is not being actively used, in order to preserve the display, and require the user to log in to resume using the system. In either case, and in many other possible cases, the preferred embodiment would allow the user to operate the system without logging in again if he does so before the password delay time has expired.

Alternate Embodiment: Delay Based On Shutdown

In an alternate embodiment, the selected delay value is used to indicate the amount of time after system shutdown that the security system will be disabled. In this embodiment, when the system enters a low-power state, whether by being placed there by the user or automatically to conserve power, it first adds the user-selected delay time to the current system time and stores the result in memory. Thereafter, as above, when a user attempts to log into the device, the current time and the stored time are compared, and if that time period has not expired, the system bypasses the security password system.

Because, in this embodiment, the stored time is calculated as the system is shut down, the programmable disabling of the security system is measured by the amount of time the system has been shut down (or placed in a reduced-power state), not by when the system was last logged on. This embodiment provides a significant advantage when a system is used constantly over a substantial amount of time, but is set aside for a relatively short amount of time as the user switches tasks, takes a break, etc.

Alternate Embodiment: Non-Volatile Storage of Delay Time

According to an alternate embodiment, the storage of the delay time is done in non-volatile memory. This provides particular advantages in systems, such as conventional portable or desktop computers, in which the system is powered down completely (placed in an OFF state) or removed from power altogether. This embodiment would also be useful in portable or handheld computers that must have the power temporarily removed while batteries are changed.

FIG. 1 shows a block diagram of a computer system according to the preferred embodiment. In this figure, the system microprocessor 100 is connected to control the display 105. Connected to the microprocessor via a high-speed internal bus 110 to the system memory, which includes ROM 115, RAM 120, and FLASH memory 125. The microprocessor is also connected, via a second bus 130, to control a variety of optional peripherals. These include PCMCIA port 135, modem 140, keyboard 145, touch panel 150, mouse 155, serial port 160, and infrared port 165. Note that this is simply an exemplary system, and many modifications of the basic system may be made which still take full advantage of the claimed features. For example, a touch sensitive display screen may be used, which combines the function of the display, keyboard, touchpanel, and mouse.

Figure 2:
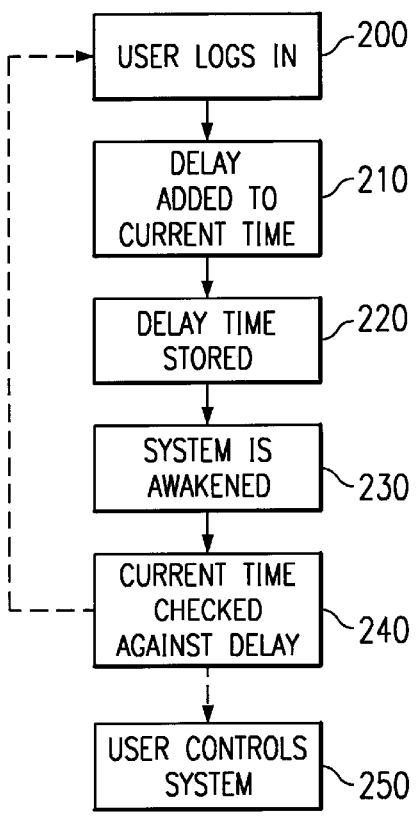
FIG. 2 shows a flowchart of the process of the presently preferred embodiment.

FIG. 2 shows a flowchart of the innovative password delay security system according to the preferred embodiment. In this flowchart, it is assumed that the delay time is already configured as described above. When the user logs into the system using an appropriate password (step 200), the system adds the preconfigured password delay time to the current system time (step 210). The system stores this sum in RAM (step 220) or in a non-volatile memory. Thereafter, when the user stops using the device for a given period of time, e.g. 5 minutes, the system automatically enters a low power state. When the user next awakens the system to resume using it (step 230) the system first checks the current system time against the sum stored in step 220 (step 240). If the current time is not yet past the stored time, the user is given control of the system without any further security checks (step 250). If the current time is past the stored time, however, the user is forced to go back through the password security system before he is able to operate the system (step 200). When he has done so, the innovative password delay technique is repeated.

According to one disclosed class of innovative embodiments, there is provided a computer system, comprising: a user input device, a microprocessor which is operatively connected to detect inputs from said input device, random-access memory which is connected to be read/write accessible by said microprocessor, and an output device operatively connected to receive outputs from said microprocessor; and a power supply connected to provide power to said microprocessor and said memory; wherein when said system is not actively used for a given period of time, said system requires a user to enter a password before allowing said user to operate said system; wherein if a fixed amount of time since a password was entered has not expired, then said user will not be required to reenter said password.

According to another disclosed class of innovative embodiments, there is provided a computer system, comprising: at least one input device and at least one output device; a main system module which does not include said input and output devices, and which includes therein: at least one microprocessor which is operatively connected to detect inputs from said input device and to send data to said output device, and random-access memory which is connected to be read/write accessible by said microprocessor; a real-time clock connected to said main system module; wherein when a user logs into said system by entering a password, a value representing the current time plus a configurable delay figure is stored in said memory; wherein at least some security features of said system are disabled whenever the current time, as represented by said real-time clock, is less than said value.

According to another disclosed class of innovative embodiments, there is provided a method, comprising the steps of: requiring a user to enter a password to operate a computer system; storing a value representing the current time plus a configurable delay period in memory; when said system has been idle for a given period of time, placing said system in a reduced-power mode; when a user attempts to operate said system, comparing the current time with said stored value; if the current time has passed said stored value, then proceeding to the first step; if the current time has not passed said stored value, then allowing said user to operate said system.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Of course, the innovative teachings of the present application are not limited to any specific hardware or operating system. In fact, this innovative password delay feature may find application in any system which uses an authentication system and is used sporadically.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

What is claimed is:

1. A computer system, comprising:
    at least one input device and at least one output device;
    a main system module which does not include said input and output devices, and which includes therein: at least one microprocessor which is operatively connected to detect inputs from said input device and to send data to said output device, and random-access memory which is connected to be read/write accessible by said microprocessor;
    a real-time clock connected to said main system module;
    wherein when a user logs into said system by entering a password, a value representing the current time plus a configurable delay figure is stored in said memory;
    wherein at least some security features of said system are disabled whenever the current time, as represented by said real-time clock, is less than said value.

2. The system of claim 1, wherein said system is power by a battery.

3. The system of claim 1, wherein said system is a portable computer system.

4. The system of claim 1, wherein said system is a handheld computer system.

5. The system of claim 1, wherein said value is stored in a non-volatile memory.

6. The system of claim 1, wherein said system enters a reduced-power state when not actively used for a given period of time.

7. A method, comprising the steps of:
    (a.) requiring a user to enter a password to operate a computer system;
    (b.) storing a value representing the current time plus a configurable delay period in memory;
    (c.) when said system has been idle for a given period of time, placing said system in a reduced-power mode;
    (d.) when a user attempts to operate said system, comparing the current time with said stored value;
    (e.) if the current time has passed said stored value, then proceeding to step (a);
    (f.) if the current time has not passed said stored value, then allowing said user to operate said system; wherein said stored value is determined at step (a).

8. The method of claim 7, wherein said value is stored in a non-volatile memory.

9. The method of claim 7, wherein said system is a portable computer system.

10. The method of claim 7, wherein said system is integrated into a single unit.

* * * * *